H.C. Lockwood's Coffee-Cleaner.

No. 99215

Patented Jan 25 1870

Witnesses.
E.W. Anderson
Chas. Kenney

Inventor
H.C. Lockwood
Chipman Hosmer & Co.
Attorneys

United States Patent Office.

H. C. LOCKWOOD, OF BALTIMORE, MARYLAND.

Letters Patent No. 99,215, dated January 25, 1870.

IMPROVEMENT IN COFFEE-CLEANERS AND POLISHERS.

The Schedule referred to in these Letters Patent and making part of the same.

To all whom it may concern:

Be it known that I, H. C. LOCKWOOD, of Baltimore, in the county of Baltimore, and State of Maryland, have invented a new and valuable Improvement in Coffee-Cleaners and Polishers; and I do hereby declare that the following is a full, clear, and exact description of the construction and operation of the same, reference being had to the annexed drawings, making a part of this specification, and to the letters and figures of reference marked thereon.

Figure 1, of the drawings, is an external view of my cylinder;

Figure 1:
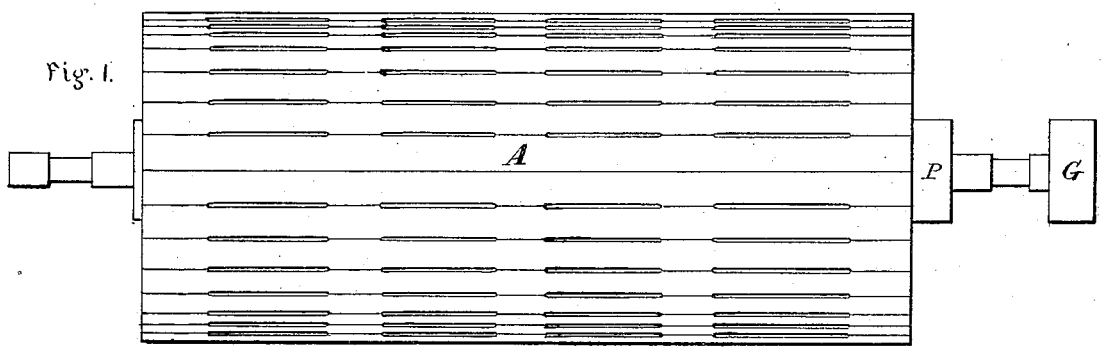
Figure 2:
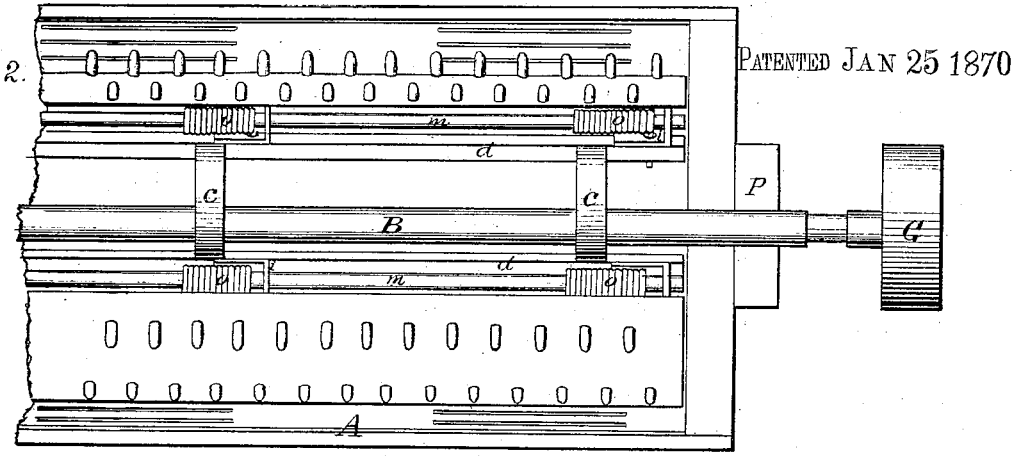
Figure 2 is a view of a longitudinal section or lower half of my device.
Figure 3:
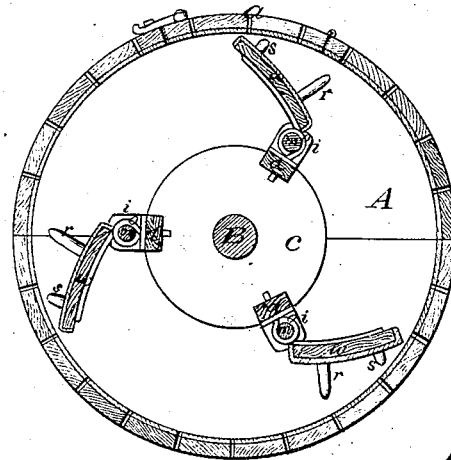
Figure 3 is a vertical section thereof.

My invention relates to means for cleaning and polishing coffee; and

It consists in a novel arrangement of devices intended to serve as an effective apparatus for the purpose mentioned.

A, of the drawings, represents a wooden cylinder, with small apertures cut usually in a longitudinal direction, and lined with tough raw hide, through which are corresponding apertures. This cylinder is formed in two sections, as shown, in one of which are small doors $a$, through which coffee is passed in and out at will.

B represents a metallic shaft, having its bearings in the ends of cylinder A, and having disks $c$ for holding the bars $d$, hereinafter mentioned, and drum $g$, to receive the band from the motor.

The letter $h$ indicates a drum, for band, upon cylinder A, by which said cylinder is operated.

The letters $d$ represent longitudinal bars, firmly attached to the disks of cylinder A, as shown, and $i$ are plates or ears, respectively attached to said bars, for the purpose of holding the rods $m$ next mentioned.

The letters $m$ represent rods, that are passed through and made secure in the ears $i$, and around which, respectively, is coiled the series of springs marked $o$, one end of said springs being made fast in a bar, $d$, and the other attached to one of the wings W.

The wings W are constructed of wood, with their outer surface covered with raw hide, and having a series of wooden pins, marked $r$ and $s$, respectively, near each edge.

The pins $s$ are short, while the pins $r$ have greater length, and when on duty each is made to pass closely upon the raw-hide lining of the cylinder.

The springs $o$ serve as hinges for these wings, as well as springs.

In actuating my device, one band is passed over the drum $h$, and another over the drum $g$, by means of which both the cylinder and shaft are rotated in the same direction, but the drum $g$ being made about one-fourth smaller than the drum $h$, the shaft is given about forty revolutions, to thirty of the cylinder.

The coffee is placed in the cylinder, and agitated by the pins on the wings until it is thoroughly cleaned and polished, the dirt and furze in the mean time passing out through the small apertures in said cylinder.

What I claim as my invention, is—

1. The springs $o$, in combination with the wings W, when constructed and arranged to operate substantially as and for the purposes specified.

2. The coffee-cleaning and polishing apparatus herein described, having cylinder A, shaft B, springs $o$, and wings W, when constructed and arranged to operate substantially as specified.

In testimony that I claim the above, I have hereunto subscribed my name, in the presence of two witnesses.

H. C. LOCKWOOD.

Witnesses:
D. D. KANE,
E. W. ANDERSON.